US007305950B1

(12) United States Patent
 Sinnamon

(10) Patent No.: US 7,305,950 B1
(45) Date of Patent: Dec. 11, 2007

(54) METHOD FOR CONTROL OF DILUTION IN ENGINES DURING VARIABLE CAMSHAFT PHASING

(75) Inventor: James F. Sinnamon, Birmingham, MI (US)

(73) Assignee: Delphi Technologies, Inc., Troy, MI (US)

( * ) Notice: Subject to any disclaimer, the term of this patent is extended or adjusted under 35 U.S.C. 154(b) by 8 days.

(21) Appl. No.: 11/441,964

(22) Filed: May 26, 2006

(51) Int. Cl.
 *F01L 1/34* (2006.01)
(52) U.S. Cl. .............................. 123/90.17; 123/90.15; 123/90.346
(58) Field of Classification Search ............ 123/90.15, 123/90.16, 90.17, 90.18, 402, 403, 345, 346, 123/347, 348; 701/102, 103, 110
 See application file for complete search history.

(56) References Cited

U.S. PATENT DOCUMENTS 6,600,989 B2 * 7/2003 Sellnau et al. .............. 701/110

* cited by examiner

*Primary Examiner*—Ching Chang
(74) *Attorney, Agent, or Firm*—Paul L. Marshall

(57) ABSTRACT

A method for coordinating engine throttle position with camshaft phaser motion during transient engine operation such that desired internal residual dilution is maintained. A dilution model for residual mass fraction and a table of desired dilution values are embedded in the engine control algorithm. The dilution model is applied to calculate the desired throttle and camshaft phaser positions for the next intake event. In a first method, if the throttle is capable of changing the airflow into the engine cylinders faster than the camshaft phasers can respond, the throttle is modulated to maintain desired dilution levels while the phasers are allowed to move as fast as they can. In a second method, if the phaser response faster than the engine intake port airflow response to a throttle position change, the throttle is allowed to move as fast as it can while phaser motion is modulated to maintain desired dilution levels.

24 Claims, 4 Drawing Sheets

METHOD FOR CONTROL OF DILUTION IN ENGINES DURING VARIABLE CAMSHAFT PHASING

TECHNICAL FIELD

The present invention relates to internal combustion engines; more particularly, to such engines having capabilities for variable camshaft phasing; and most particularly, to a method for controlling fuel mixture dilution during speed and load transients in such engines.

BACKGROUND OF THE INVENTION

Internal combustion engines having variable camshaft phasing are well known. Camshaft phasers are used to improve fuel economy and reduce formation of nitrogen oxides (NOx) by adjusting the timing of Intake Valve Opening (IVO), Exhaust Valve Closing (EVC), or both IVO and EVC independently so that the engine cylinders are held at their dilution limit during operating conditions of partial load. Cylinder dilution is defined as the fraction of burned gas left over from the previous combustion event that is contained in the cylinder during the compression stroke.

Under steady state operating conditions, the optimum positions of the cam phaser or cam phasers as a function of engine speed and load is readily determined by mapping of engine performance on an engine dynamometer. The test results are tabulated in look-up tables which are programmed into an Engine Control Module (ECM) that governs the position of the cam phasers for any given condition of engine speed and load. This procedure yields appropriate dilution control for steady-state engine operation.

A problem arises, however, during transient periods between different engine states of speed and load requiring movement of each phaser from a first position to a second position, during which time it is necessary to carefully coordinate phaser positions to the load response of the engine. The load response rate of an engine following a driver input to the accelerator pedal depends on several engine design features, and cam phaser response depends upon both its design as well as the particular engine operating condition. Depending on the response rate of the cam phasers relative to the load response of the engine, periods of either excessive dilution or sub-optimal dilution can result. If phaser response is relatively fast, the result will be too much dilution when engine load is increasing, and too little dilution when load is decreasing. If phaser response is relatively slow, the opposite occurs. Excessive dilution causes unstable combustion, while sub-optimal dilution reduces fuel economy and increases NOx emissions.

In prior art practice, to avoid excessive dilution and unstable combustion, the phaser position is calibrated conservatively, resulting in sub-optimum fuel economy and increased NOx under real vehicle driving conditions.

What is needed in the art is a method for maintaining desired optimum dilution levels during transient engine operation.

It is a principal object of the present invention permit optimum fuel mixture dilution to be maintained during transient engine operation, resulting in improved overall fuel economy and NOx emission control.

SUMMARY OF THE INVENTION

Two embodiments are described. It is understood that the embodiments described herein may include more than one phaser such as, for example, where two phasers are used—one in conjunction with the intake valve cam shaft and one in conjunction with an exhaust valve cam shaft. Also, unless specifically identified in the description as being one or the other, when the term "phaser" is used, it should be taken to mean either an intake valve phaser or an exhaust valve phaser, or both.

For the first embodiment, it is assumed that the ECM and the throttle valve are capable of changing airflow to the engine cylinders faster than the phaser can respond, in which case the intake air flow may be adjusted to follow optimally the progress of the phaser during its movement from a first position to a second position by calculating and setting an optimal intake air flow at a sequential plurality of phaser transient positions.

In some cases, movement of the phaser is faster than the engine intake port airflow response to a throttle position change. Thus, in another embodiment, the intake and exhaust cam phaser positions may be adjusted to follow optimally the progress of the throttle.

Briefly described, a method in accordance with a first embodiment of the invention commands phaser positions according to the desired engine load as indicated by the driver's accelerator pedal command and the phaser is allowed to move as fast as it can, while the throttle is dynamically adjusted to properly coordinate the airflow to achieve a desired residual dilution fraction dynamically.

In a second embodiment of the invention, the throttle is allowed to move as fast as it can in response to the driver's accelerator pedal command, while the phaser position commands are modulated by the ECM to deliver the desired residual dilution fraction dynamically.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
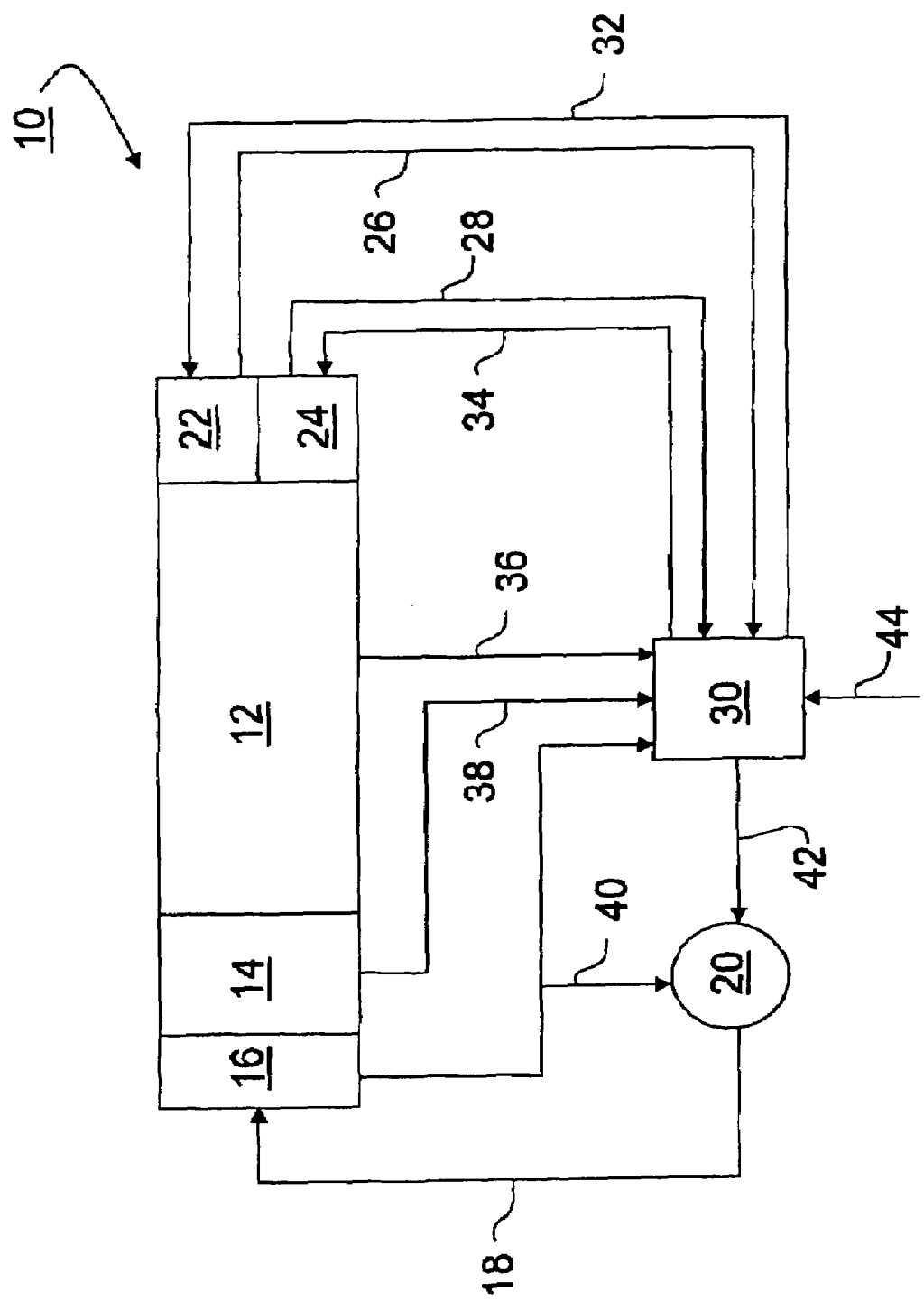
FIG. 1 is a schematic diagram of a feedback control system for an internal combustion engine.

Referring to FIG. 1, a throttle and cam phaser control system 10 for use in accordance with the invention comprises an internal combustion engine 12 having an intake manifold 14 for supplying intake air to engine 12 and a throttle valve 16 for regulating the flow of air into manifold 14. The position of throttle valve 16 is regulated by a signal 18 sent from an electronic throttle controller (ETC) 20.

Engine 12 includes at least an intake valve camshaft phaser 22, or an exhaust valve camshaft phaser 24 and optionally both an intake and exhaust valve camshaft phaser 22,24. Each phaser 22,24 sends a position signal 26,28 to an engine control module (ECM) 30 defining a programmable controller or computer as is known in the engine control arts; and each phaser 22,24 receives a position command 32,34 from ECM 30. (For engines not equipped with an exhaust valve camshaft phaser 24, signals 28,34 obviously are omitted. For engines not equipped with an intake valve camshaft phaser 22, signals 26,32 obviously are omitted.)

An engine speed (RPM) signal 36 is sent to ECM 30 from engine 12. A manifold air pressure (MAP) signal 38 is sent to ECM 30 from manifold 14. A throttle valve position signal 40 is sent to ECM 30 and ETC 20 from throttle valve 16. An accelerator pedal input signal 44 received from a driver's actuation of the accelerator pedal is normally interpreted by the ECM 30 as a desired torque output or load from the engine 12. As shown in FIG. 1, ECM 30 calculates a desired throttle position and sends a signal 42 to ETC 20, which adjusts the throttle position via signal 18.

Figure 2:
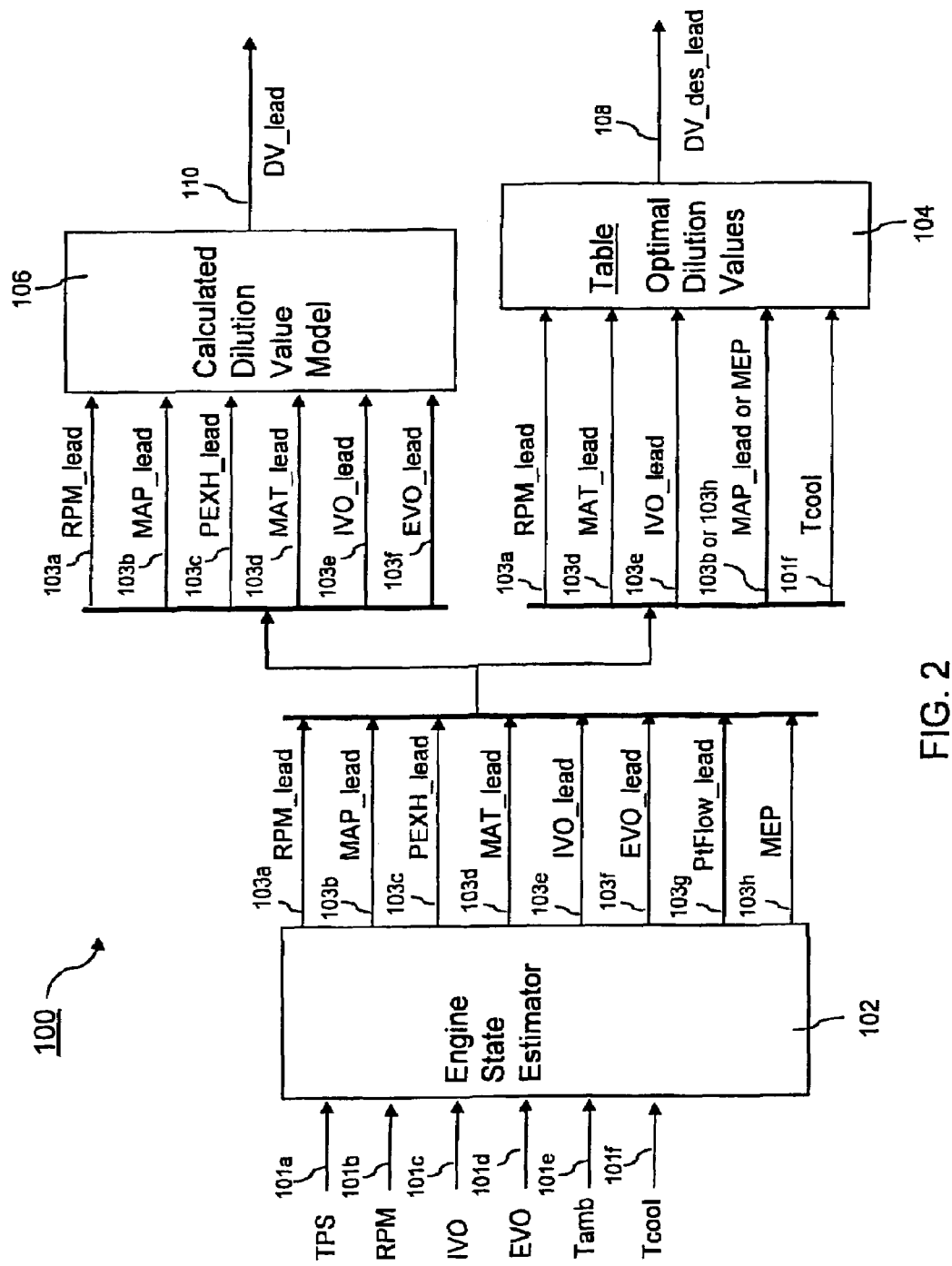
FIG. 2 is a schematic logic diagram for operating the control system shown in FIG. 1 in accordance with the invention.

Referring to FIG. 2, a schematic logic diagram 100 for operating throttle and cam phaser control system 10 shown in FIG. 1 includes an engine state estimator 102, table of desired dilution values 104 and a calculated dilution value model 106, all of which preferably reside within ECM 30.

Estimator 102 comprises lock-up tables, equations, algorithms, or combinations of these three that; (1) can received signals of various current engine parameters 101a-f, such as for example, throttle position 101a, engine speed 101b, the opening time of the intake valve 101c and of the exhaust valve 102d by detecting the intake and exhaust cam phaser positions, ambient temperature 101e and engine coolant temperature 101f; and (2) predicts certain engine conditions 103a-h that will exist at the next engine event in the combustion cycle. For example, the "lead" engine speed 103a, manifold air pressure 103b, exhaust manifold pressure 103c, manifold absolute temperature 103d, intake valve cam phaser position 103e, exhaust valve cam phaser position 103f, intake port flow 103g and engine output (MEP, mean effective pressure) 103h are predicted.

Table 104 comprises a map of optimal dilution values for dilute limit operation (dilution tolerance) as a function of various engine operating conditions (for example, engine speed, manifold absolute temperate, intake cam phaser position, engine load and coolant temperature) as may be generated in known fashion either by a well-calibrated engine simulation or by direct-cylinder gas sampling during the compression stroke of the engine on a test stand during operation under dilution-limited conditions. The engine operating condition inputs to Table 104, for purposes of selecting a specific optimal dilution value for the inputted operating conditions, may include predicted engine speed 103a, predicted manifold absolute temperate 103d, predicted opening time of the intake valve 103e and an engine load parameter (manifold air pressure 103b or MEP 103h) as received from engine state estimator 102, and a coolant temperature signal 101f from an engine sensor. The output of Table 104 is the desired dilution value 108 for the next engine intake event (DV_des_lead).

Calculated dilution value model 106 comprises a map of actual dilution values in a cylinder of engine 12 as a function of predicted RPM 103a, predicted manifold air pressure 103b, predicted exhaust manifold pressure 103c, predicted manifold absolute temperature 103d, predicted intake cam phaser position 103e and predicted exhaust valve cam phaser position 103f. The dilution value model 106 is derived from actual dilution values which may be generated in known fashion either by a well-calibrated engine simulation model or by direct-cylinder gas sampling during the compression stroke of the engine on a test stand. The output of the dilution model 106 is a predicted value of actual dilution for the next engine intake event 110 (DV_lead).

Figure 3:
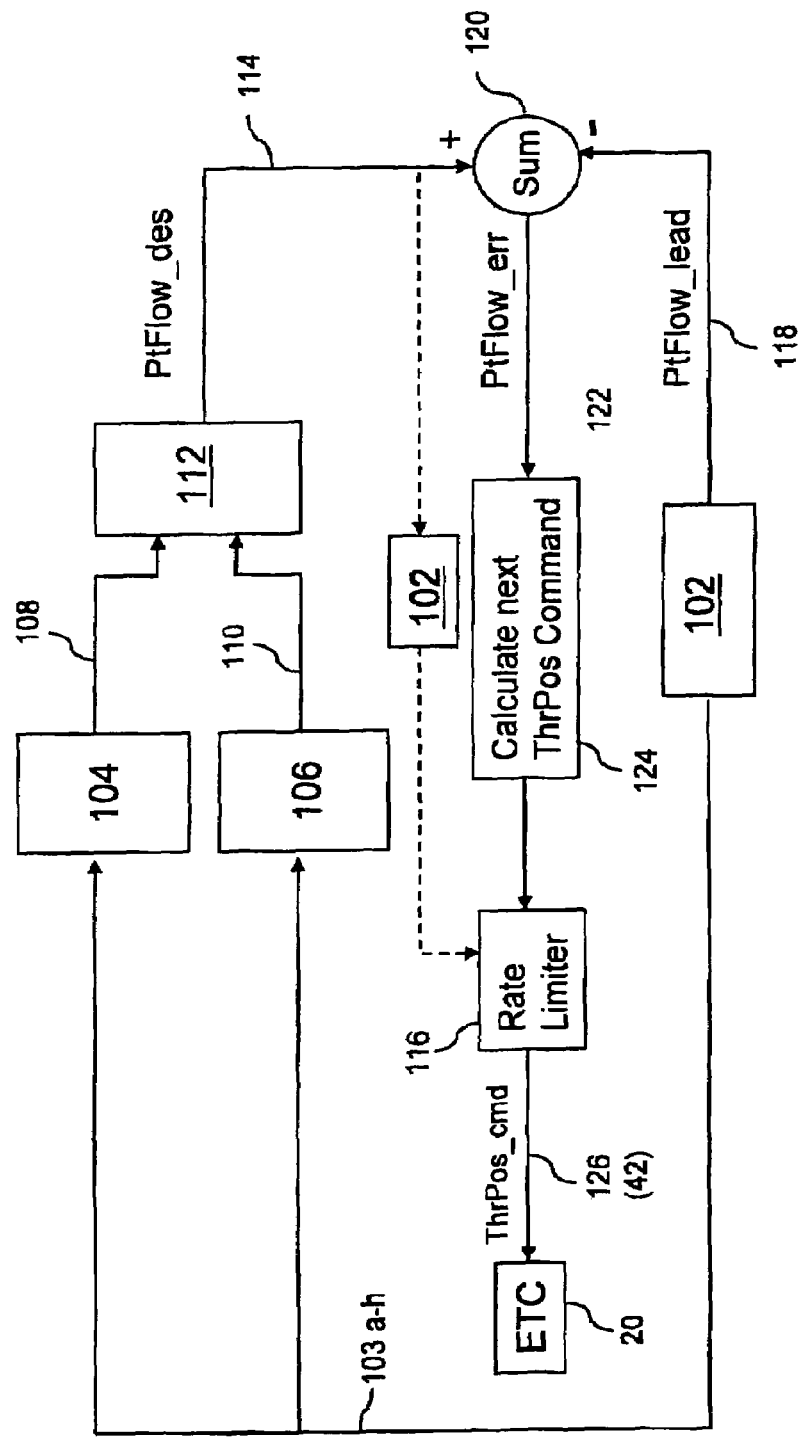
FIG. 3 is a schematic logic diagram for operating the control system specific to the first embodiment.

Referring to FIGS. 2 and 3, In a first embodiment, throttle valve position is adjusted to follow optimally the progress of the phasers from a first position to a second position by calculating and setting an optimal intake air flow (throttle valve position) at a sequential plurality of phaser transient positions. A method in accordance with the first embodiment of the invention for setting an optimal throttle position during transient engine operating conditions comprises the following steps:

a) provide an engine state estimator 102 for receiving current engine parameters such as throttle position 101a, engine speed 101b, intake valve cam phaser position 101c, exhaust valve cam phaser position 101d, ambient temperature 101e and engine coolant temperature 101f and for predicting, for the next engine intake event, engine speed 103a, manifold air pressure 103b, exhaust manifold pressure 103c, manifold absolute temperature 103d, intake valve cam phaser position 103e, exhaust valve cam phaser position 103f, intake port flow 103g and mean effective pressure 103h;

b) generate a table of optimal dilution values 104 for dilute limit operation as a function of predicted engine speed, manifold absolute temperature, intake valve cam phaser position, and engine load and current (coolant temperature) engine operating conditions;

c) provide a model of calculated dilution values 106 as a function of engine operating conditions (engine speed, manifold absolute pressures and temperatures) and phaser positions;

d) calculate an optimal dilution value 108 from Table 104 using predicted engine speed 103a, manifold air temperature 103d, intake valve cam phaser position 101e and the engine load parameter 103b or 103h and current (coolant temperature) engine operating conditions 101f;

e) calculate an actual dilution value 110 from Model 106 using the predicted engine operating conditions 103a-f received from engine state estimator 102. (This is the expected dilution level for the next cylinder event if no corrective action is taken by the controller);

f) use the optimal dilution value 108 and the calculated actual dilution value 110 to calculate 112 a desired intake port flow (PtFlow_des) 114 for the next intake event that will cause calculated actual dilution value 110 to equal optimal dilution value 108; PtFlow_des may be calculated according to the equation:

PtFlow_des=(calculated actual dilution value/optimal dilution value)×PtFlow_lead g) compare 120 the desired intake port flow 114 to the predicted intake port flow 118 and generate an error signal (PtFlow_err) 122: the difference or error is an estimate of how much the intake port airflow must be increased or decreased by throttle 16 for the next intake event; and h) calculate a new corrected throttle position 124 and set a new, corrected throttle position 126/42 based on the error signal 122 generated in g).

An alternative method, as shown by a dotted line in FIG. 3, is to input PtFlow_des 114 into the engine state estimator 102 and calculate a new corrected throttle position. Since there is a lower limit to the throttle response rate that drivers will accept, a rate-limiting step 116 should be included.

Figure 4:
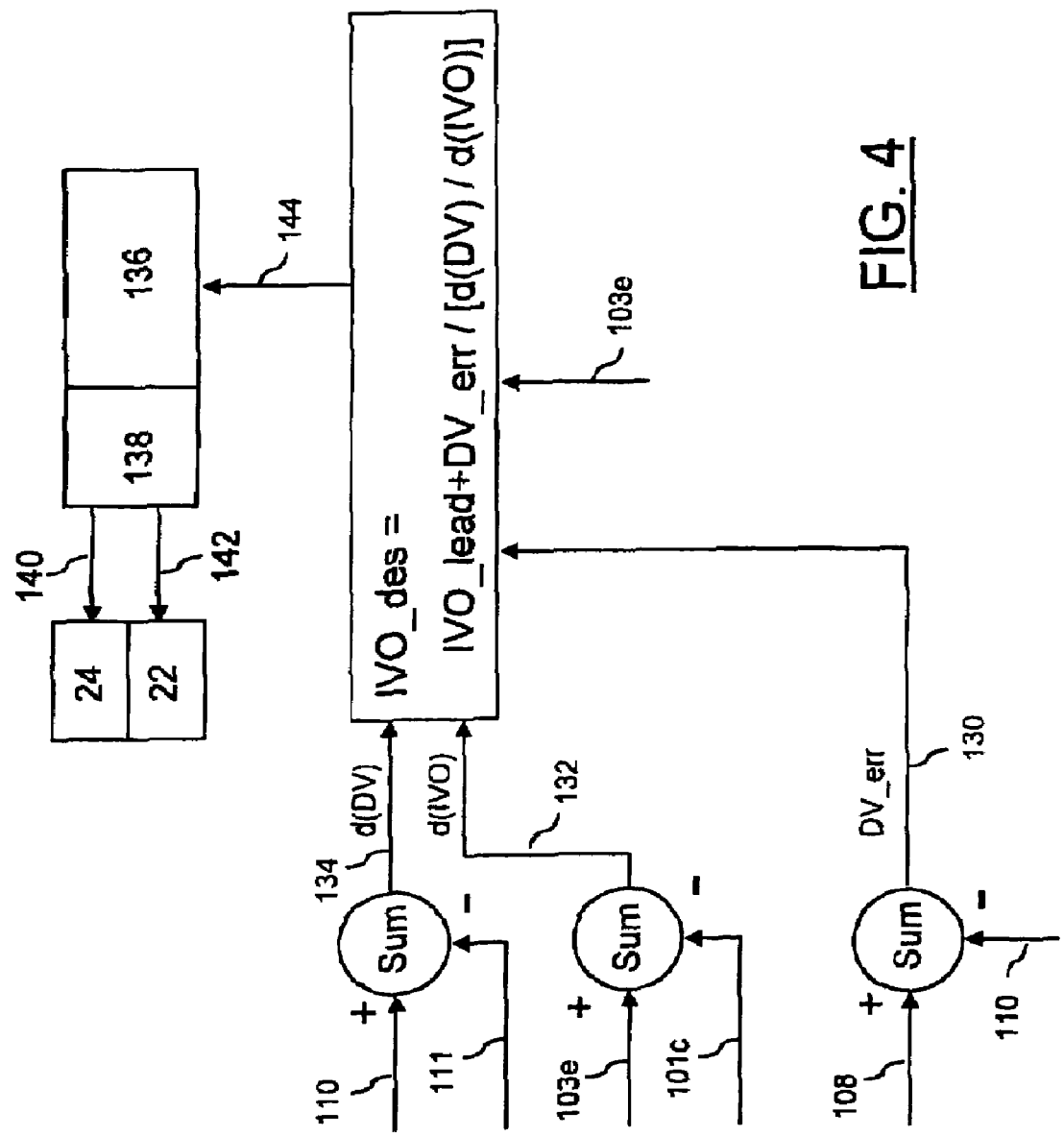
FIG. 4 is a schematic logic diagram for operating the control system specific to the second embodiment.

Referring to FIGS. 2 and 4, in a second embodiment, where the reaction time of the phaser is fast relative to the change of airflow to the engine cylinders following a movement of a transient throttle valve, the phaser positions are adjusted to follow optimally the progress of engine airflow resulting from the throttle valve's movement from a first position to a second position by calculating and setting an optimal position of the phasers at a sequential plurality of throttle valve transient positions. A method in accordance with the second embodiment of the invention for setting a phaser position during transient engine operating conditions comprises the following steps (steps a-e in the first embodiment are the same as steps a-e in the second embodiment):

a) provide an engine state estimator 102 for receiving current engine parameters such as throttle position 101a, engine speed 101b, intake valve cam phaser position 101c, exhaust valve cam phaser position 101d, ambient temperature 101e and engine coolant temperature 101f and for predicting, for the next engine intake event, engine speed 103a, manifold air pressure 103b, exhaust manifold pressure 103c, manifold absolute temperature 103d, intake valve cam phaser position 103e, exhaust valve cam phaser position 103f, intake port flow 103g and mean effective pressure 103h;

b) generate a table of optimal dilution values 104 for dilute limit operation as a function of predicted engine speed, manifold absolute temperature, intake valve cam phaser position, and engine load and current (coolant temperature) engine operating conditions;

c) provide a model of calculated dilution values 106 as a function of engine operating conditions (engine speed, manifold absolute pressures and temperatures) and phaser positions;

d) calculate an optimal dilution value 108 from Table 104 using predicted engine speed 103a, manifold air temperature 103d, intake valve cam phaser position 101e and the engine load parameter 103b or 103h and current (coolant temperature) engine operating conditions 101f;

e) calculate an actual dilution value 110 from Model 106 using the predicted engine operating conditions 103a-f received from engine state estimator 102. (This is the expected dilution level for the next cylinder event if no corrective action is taken by the controller);

f) compare the optimal dilution value 108 with the calculated actual dilution value 110 and generate a dilution value error signal (DV_err) 130 which is an estimate of the amount by which the dilution value must be increased or decreased for the next intake event, by changing the position of the intake valve cam phaser;

g) compare the predicted value for dilution 110 to the current value 111 to generate a value for the expected change of dilution, d(DV) 134;

h) compare the predicted intake valve cam phaser position 103e to the current intake valve cam phaser position 101c to generate an expected change of phaser position, d(IVO) 132;

i) calculate a desired intake valve cam phaser position (IVO_des) 144 using the following equation:

$$IVO\_des = \text{predicted intake valve cam phaser position} + DV\_err/[d(DV)/d(IVO)],$$

j) generate a Table 136 of exhaust valve cam phaser position/intake valve cam phaser position ratios (EVO/IVO) that yield optimal dilution values over steady-state engine operating conditions;

k) calculate 138 a desired exhaust valve cam phaser position (EVO_des) using the following equation:

$$EVO\_des = [EVO/IVO] \times IVO\_des$$

l) set a new, corrected intake valve cam phaser position 140 and a new, corrected exhaust valve cam phaser position 142 based on the calculation made in step i, j and k Since on a given vehicle application the response rate of the valve cam phasers relative to the airflow response due to a throttle change may vary depending on operating conditions, a practical controller may use a combination of the above two embodiments.

While the invention has been described by reference to an engine having both intake valve and exhaust valve cam phasers, it is understood that the system in accordance with the invention is also applicable to an engine having only an intake valve cam phaser or only an exhaust valve cam phaser.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A method for operating an internal combustion engine having at least one combustion cylinder, an air intake manifold, a throttle valve in communication with said manifold, and at least one camshaft phaser, the method being useful to vary flow of air into a cylinder intake port in the manifold while changing rotational position of said phaser, comprising the steps of:
    a) changing phaser position from a first position to a second position through a plurality of instantaneous intermediate positions;
    b) calculating a plurality of desired values of air flow into an engine cylinder port, one such value for each of said intermediate phaser positions; and
    c) adjusting said throttle valve to provide a desired air flow and a desired dilution value as said phaser is passing through corresponding of said intermediate phaser positions.

2. A method for operating an internal combustion engine having at least one combustion cylinder, an air intake manifold, a throttle valve in communication with said manifold, and at least one camshaft phaser, the method being useful to vary flow of air into a cylinder intake port in the manifold according to a plurality of engine operating conditions including phaser position, comprising the steps of:
    a) calculating a desired dilution value in said at least one combustion cylinder, based upon certain predicted engine conditions;
    b) predicting an actual dilution value based upon certain predicted engine conditions;
    c) calculating a desired intake port air flow to provide said desired dilution value in said combustion cylinder; and
    d) adjusting said manifold throttle valve to provide said desired intake port air flow and said desired dilution value.

3. A method in accordance with claim 2 wherein said calculating a desired intake port air flow step further comprises
    a) determining an actual intake port air flow;
    b) calculating an intake port air flow error between said actual intake port air flow and said desired intake port air flow; and
    c) calculating a corrected throttle command to adjust said manifold throttle valve in accordance with said corrected throttle command.

4. A method in accordance with claim 3 further including a step of limiting a throttle response rate when adjusting said manifold throttle valve.

5. A method in accordance with claim 2 wherein said certain predicted engine conditions for calculating said desired dilution value include at least one of an engine speed, manifold absolute temperature, intake valve cam phaser position and engine load parameter.

6. A method in accordance with claim 5 wherein said calculated desired dilution value is further based on at least one current engine operating condition.

7. A method in accordance with claim 6 wherein said at least one current engine operation condition is coolant temperature.

8. A method in accordance with claim 2 wherein said step a) includes use of a look-up table of desired dilution values.

9. A method in accordance with claim 2 wherein said step b) includes use of a model for predicting said actual dilution values based upon certain predicted engine conditions.

10. A method in accordance with claim 2 wherein said certain predicted engine conditions for predicting an actual dilution value include at least one of an engine speed, manifold absolute pressure, manifold air temperature and phaser position.

11. A method in accordance with claim 2 wherein said step c) includes a calculation in accordance with the equation $PtFlow\_des$=(calculated actual dilution value/optimal dilution value)$\times PtFlow\_lead$.

12. An internal combustion engine comprising at least one combustion cylinder, an air intake manifold, a throttle valve in communication with said manifold, and at least one camshaft phaser, wherein said engine is operated in accordance with a method comprising the steps of:
   a) calculating a desired dilution value in said at least one combustion cylinder;
   b) predicting an actual dilution value;
   c) calculating a desired intake port air flow to provide said desired dilution value in said combustion cylinder;
   d) determining an actual intake port air flow;
   e) calculating an intake port air flow error between said actual intake port air flow and said desired intake port air flow; and
   f) calculating a corrected throttle command to adjust said manifold throttle valve in accordance with said corrected throttle command.

13. A method for operating an internal combustion engine having at least one combustion cylinder, an air intake manifold, a throttle valve in communication with said manifold, and at least one camshaft phaser, the method being useful to vary rotational position of said at least one camshaft phaser while changing position of said throttle valve, comprising the steps of:
   a) changing throttle valve position from a first position to a second position through a plurality of instantaneous intermediate positions;
   b) calculating a plurality of desired positions for said at least one camshaft phaser, one such value for each of said intermediate throttle positions; and
   c) adjusting the angular position of said at least one camshaft phaser to provide a desired dilution value as said throttle valve is passing through corresponding of said intermediate throttle valve positions.

14. A method for operating an internal combustion engine having at least one combustion cylinder, an air intake manifold, a throttle valve in communication with said manifold, and at least one camshaft phaser, the method being useful to vary an angular position of said at least one camshaft phaser according to a plurality of engine operating conditions including throttle valve position, comprising the steps of:

a) calculating a desired dilution value in said at least one combustion cylinder, based upon certain predicted engine conditions, including a current throttle valve position;
   b) predicting an actual dilution value based upon certain predicted engine conditions including predicted throttle valve position;
   c) calculating a desired angular position of a first camshaft phaser of said at least one camshaft phaser to provide said desired dilution value; and
   d) adjusting said angular position of said first camshaft phaser to match said desired angular position to provide said desired dilution value.

15. A method in accordance with claim 14 wherein said calculating a desired angular position of a first camshaft phaser further comprises
   a) comparing said desired dilution value to said predicted actual dilution value to estimate the amount the dilution value must increase or decrease to match the desired dilution value;
   b) generating a dilution value error signal based on the estimated amount the dilution value must increase or decrease to provide said desired dilution value; and
   c) calculating a corrected cam phaser angular position command to adjust said cam phaser to provide said desired dilution value.

16. A method in accordance with claim 14 wherein said certain predicted engine conditions for calculating said desired dilution value include at least one of an engine speed, manifold absolute temperature, intake valve cam phaser position and engine load parameter.

17. A method in accordance with claim 16 wherein said calculated desired dilution value is further based on at least one current engine operating condition.

18. A method in accordance with claim 17 wherein said at least one current engine operation condition is coolant temperature.

19. A method in accordance with claim 14 wherein said step a) includes use of a look-up table of desired dilution values.

20. A method in accordance with claim 14 wherein said step b) includes use of a model for predicting said actual dilution values based upon certain predicted engine conditions.

21. A method in accordance with claim 14 wherein said certain predicted engine conditions for predicting said actual dilution value include at least one of an engine speed, manifold absolute pressure, manifold air temperature and phaser position.

22. A method in accordance with claim 14 wherein said at least one camshaft phaser includes a second camshaft phaser, said method further comprising the steps of:
   a) determining ratios of first camshaft phaser angular position to second camshaft phaser angular position that provide optimal dilution values over various steady-state engine operating conditions;
   b) calculating a desired angular position for said second camshaft phaser based on said determined ratios; and
   c) adjusting an actual angular position of said second camshaft phaser.

23. A method in accordance with claim 22 wherein said calculating a desired angular position for said second camshaft phaser step includes a calculation in accordance with the equation EVO_des=[EVO/IVO]×IVO_des.

24. An internal combustion engine comprising at least one combustion cylinder, an air intake manifold, a throttle valve in communication with said manifold, and at least one camshaft phaser, wherein said engine is operated in accordance with a method comprising the steps of:
- a) calculating a desired dilution value in said at least one combustion cylinder;
- b) predicting an actual dilution value;
- c) comparing said desired dilution value to said predicted actual dilution value to estimate the amount the dilution value must increase or decrease to match the desired dilution value;
- d) generating a dilution value error signal based on the estimated amount the dilution value must increase or decrease; and
- e) calculating a corrected cam phaser angular position command to adjust said cam phaser in accordance with said corrected position command.

* * * * *